United States Patent [19]

Gerace et al.

[11] Patent Number: 5,039,768

[45] Date of Patent: Aug. 13, 1991

[54] HOT APPLIED PLASTISOL COMPOSITIONS

[76] Inventors: Michael J. Gerace; Janet M. Gerace, both of Dayton, Ohio

[21] Appl. No.: 467,913

[22] Filed: Jan. 22, 1990

Related U.S. Application Data

[63] Continuation of Ser. No. 301,702, Jan. 26, 1989, Pat. No. 4,900,771.

[51] Int. Cl.$^5$ .............................................. C08F 22/06
[52] U.S. Cl. .................... 526/279; 526/317.1; 526/318.3; 526/324; 526/338; 528/393; 524/569
[58] Field of Search ............... 525/114, 116; 526/279; 528/393

[56] References Cited

U.S. PATENT DOCUMENTS

| | | | |
|---|---|---|---|
| 3,560,589 | 2/1971 | Sato et al. | 526/279 |
| 3,707,518 | 12/1976 | Bemmels et al. | 526/279 |
| 3,966,687 | 6/1976 | Ribba | 526/279 |

FOREIGN PATENT DOCUMENTS 59-024767  2/1984  Japan ................................ 526/279

*Primary Examiner*—Joseph L. Schofer
*Assistant Examiner*—Mark D. Sweet
*Attorney, Agent, or Firm*—Killworth, Gottman Hagan & Schaeff

[57] ABSTRACT

Thermally stable hot applied plastisol compositions are especially useful in the assembly of metal parts. The compositions have adhesive and sealant qualities which allow them to be used in automotive assembly plants. Compositions of the invention comprise as major ingredients finely divided polyvinyl chloride resin, plasticizer, thermoplastic polymeric resin which is solid at room temperature but softens to a flowable state at application temperature, and an adhesion promotion system. Optionally a filler, wax, heat stabilizer, pigment, wetting agent, or mixtures thereof may be added. The individual components work synergistically to get good application properties, metal adhesion, wash-out resistance, and paintability.

14 Claims, No Drawings

HOT APPLIED PLASTISOL COMPOSITIONS

This is a continuation of application Ser. No. 301,702, filed Jan. 26, 1989 now U.S. Pat. No. 4,900,771.

This invention relates to plastisol compositions. More particularly the invention relates to thermally stable plastisol compositions which are capable of being hot applied to metal surfaces for adhesive and sealant purposes.

Adhesive and sealant compositions are widely used in many commercial and industrial production processes. A multitude of such compositions have been developed over the years, many of which were designed for a special use. Adhesive compositions generally are used to bind two substrates together. Sealant compositions generally are used to form a load-bearing elastic joint between two substrates. The sealants also exclude dirt, moisture and other materials from the joint and form a smooth juncture at the joint. Necessarily, there is some overlap in the functions of the adhesive and sealant compositions.

The automotive industry is a major user of both adhesive and sealant compositions. Automobiles are assembled from several structural components. The components are joined together in various fashions depending on the particular components and the degree of stress that will have to be endured. For certain assembly steps an adhesive composition applied as a liquid and subsequently hardened provides sufficient bonding strength. For example, metal assemblies of door panels, quarter panels, tailgates, and roofs use adhesive compositions. These same assemblies also use sealant compositions at a later stage in the assembly line. Still other automobile assemblies which are welded or bolted together use sealant compositions in their seams. The wheel house, shock tower, rocker panel, firewall, floor hem flange, floorpan, and trunk are a few examples of where sealants, but not adhesives, are used.

Typical automobile body assembly lines contain a separate body shop and paint shop areas where adhesives and sealants are individually used in each area respectively. Adhesive compositions applied in the body shop area are normally high strength epoxy or modified-epoxy adhesives which are capable of bonding to oily galvanized steel. In some cases vinyl plastisols are employed, however, these applications are normally limited to situations that do not require high bonding performance. In any case, these materials are applied at room temperature and later cured through exposure to heat. A current weakness of these materials is that in order to apply them, they must be of low enough viscosity to be mechanically pumped with adequate flow rates. Normally, because of their low viscosity these materials are easily displaced when exposed to liquid impingement by various cleaning solutions (washes) to which the assembly body parts are exposed.

Recently a new class of materials referred to as curing hot applied adhesives have been introduced in the automotive body shop. These are urethane or epoxy-modified urethanes and are solid or semi-solid at room temperature. These adhesives function by changing from a flowable fluid at an elevated application temperature to a bonding solid at use temperature. The hot applied adhesives have a number of characteristics which make them attractive for use in the body shop area. They are usually solvent free and thus no special fume collection hoods are needed. They have low viscosities when made fluid and thus flow readily to fill gaps and wet the substrates to be bonded. Most importantly the resins after application provide a high strength bond and cure to an even higher strength after passage through drying ovens at a later stage on the line. Additionally, the applied adhesive compositions have a rapid set time. They will not be displaced when exposed to liquid impingement by various washes and electrophoretic priming fluids to which the assembled body parts are subjected.

The assemblied parts as they move from the body shop area are subjected to sealing, painting, and final oven curing in the paint shop area. Sealant compositions used in this area must also have a certain set of characteristics to be acceptable. Vinyl plastisol compositions have been found to have those needed characteristics. Basically, a vinyl plastisol is a finely divided polyvinyl chloride resin suspended in a plasticizer. The plastisols are liquids which are applied at room temperature to the substrate. The liquid is converted to a solid through exposure to heat. In effect, the heat causes the suspended resin particles to be fused or dissolved in the plasticizer. A solid product results upon subsequent cooling.

Vinyl plastisols are excellent as sealants in the paint shop area of the body assembly line. They flow readily at room temperature to fill seams and body joints which need to be sealed. They adhere well to primed metal surfaces. They can be painted over without leaching or causing other cosmetic problems. Finally, they are durable enough to withstand normal weather and user exposure. Another important quality of the vinyl plastisols is that they are not expensive. The plastisols would ideally be used in all adhesive and sealing phases of the automotive assembly process if they had better metal bonding properties and could withstand the washes and primer applications experienced in the body shop area of the process.

Accordingly, a need exists for a product with both strong adhesive and excellent sealant properties and for compositions which combine the characteristics of both the curing hot applied adhesives and the vinyl plastisols.

SUMMARY OF THE INVENTION

That need is met by the present invention which provides a thermally stable hot applied plastisol composition. That composition has a host of qualities which makes it attractive for bonding and/or sealing joints areas in metal assemblies such as automobile bodies and parts thereof.

The hot applied thermally stable plastisol composition of the present invention comprises as a principal component thereof from about 20% to about 35% of a finely divided polyvinyl chloride resin. The composition preferably contains a mixture of two polyvinyl chloride resins which comprise about 23-32% and most preferably about 25-30% of the composition. The first resin may be a homopolymer dispersion resin with inherent viscosity of about 1.00 ml/g and is preferably between 50 and 100% and most preferably between 50% and 75% of the resin system. The second resin is a blending resin that may be a copolymer of vinyl chloride and maleic ester with inherent viscosity of about 0.97 ml/g and is preferably between 0 and 50% and most preferably between 25% and 50% of the resin system.

A second major component of the present composition is from about 15% to about 35% of a plasticizer.

The plasticizer is preferably diisodecyl phthalate and preferably is about 19-30% and most preferably about 22-30% of the composition.

Also included is about 2-25% of a thermoplastic polymeric resin, preferably about 5-20% and most preferably about 10-15% of a vinyl acetate/ethylene copolymer having a vinyl acetate content preferably of about 50-70% and most preferably about 60-65%.

Finally there is present about 3-15% of an adhesion promotion system. The adhesion promotion system preferably comprises about 5-13% and most preferably about 5-11% of the total composition. The adhesion promotion system preferably contains an unsaturated organosilane (between about 0.1 and 1% of the total composition and 2.7-5.0% of the adhesion promotion system), an acrylic monomer (between 2 and 8% of the total composition and 54.0-40.0% of the adhesion promotion system), an unsaturated acid or anhydride monomer (between 0.1 and 2% of the total composition and 2.7-10.0% of the adhesion promotion system) an epoxy or modified epoxy resin (between 0.5 and 4% of the total composition and 13.5-20.0% of the adhesion promotion system) and a hardening agent for the epoxy resin, such as a polyamide (between 1 and 5% of the total composition and 27.0-25.0 of the adhesion promotion system).

Optionally the composition also contains filler, waxes, heat stabilizers, pigment, wetting agents and various combinations and mixtures thereof.

the composition of the present invention has both adhesive and sealant characteristics which make it especially useful in the assembly of metal automotive parts. The plastisol composition of the present invention is thermally stable, can be hot applied to automotive parts for adhesive and sealant purposes, and can subsequently withstand the successive steps of a primer application, primer wash-off, top coat paint application and oven bake.

The preferred method of bonding and/or sealing using the present composition involves hot applying the plastisol composition to joint areas of a metal assembly, followed by cooling the composition sufficiently to achieve sufficient bonding. If an automobile body or a part thereof is being sealed in this manner, the method may in some instances further involve applying a primer composition to the metal assembly, heating the metal assembly to cure the primer, and applying additional plastisol composition to joint areas to form a sealed smooth surface. In any event, it will usually involve applying a paint composition to the metal assembly, and baking the metal assembly to cure the plastisol composition and the paint composition.

Accordingly, it is an object of the present invention to provide a hot applied thermally stable plastisol composition having adhesive and sealant qualities useful in the assembly of automobile bodies, and to a method of bonding and/or sealing joint areas in metal assemblies using such a composition. Other objects and advantages of the invention will become apparent from the following detailed description and the appended claims.

DETAILED DESCRIPTION OF THE INVENTION

As mentioned the composition of the present invention comprises as major ingredients finely divided polyvinyl chloride resin, plasticizer, thermoplastic polymeric resin and an adhesion promotion system. Each of the individual components of the composition will be discussed in detail as well as the composition's mode of use. All percentages and ratios are by weight unless otherwise stated.

Polyvinyl chloride resins used in the compositions of this invention are finely divided resin particles which are capable of being dispersed in a plasticizer. The resins are well known and have been widely used in plastisol compositions. The polyvinyl chloride resins include polymers of vinyl chloride as well as copolymers of vinyl chloride with copolymerizable vinyl addition monomers. Examples of such vinyl addition monomers include vinyl acetate, the vinyl acetals, maleic esters, styrene, vinylidene chloride and acrylonitrile. The particularly preferred polyvinyl chloride resins are the fine particle dispersion type homopolymer resins and vinyl chloride/maleic ester copolymers in a monomer weight ratio of vinyl chloride to maleic ester of from about 99:1 to about 90:10. Blends of several different polyvinyl chloride resins may also be used and will also be referred to as the polyvinyl chloride resin, even though more than one resin may actually be present. Actually, as mentioned, a blend of 50-100% and most preferably 50-75% of a homopolymer dispersion resin and 0-50% and most preferably 25-50% of a vinyl chloride/maleic ester copolymer blending resin is preferred.

Plasticizers useful in the present invention include monomeric types selected to achieve desired characteristics such as proper gelation, fusion, and flow properties. Examples of such monomeric plasticizers include monomeric esters of phthalic, benzoic, succinic, adipic, sebacic, talic, lauric, azelaic, caprylic, hexanoic, phosphoric, oleic, glutaric, trimellitic and stearic acids. Specific plasticizers include dioctyl phthalate, ethylene glycol dibenzoate, dioctyl succinate, dibutyl sebacate; dibenzyl azelate; didecyl glutarate and similar compounds. Other monomeric plasticizers include esters of 2, 2, 4-trimethyl-1,3-pentanediol, citric acid esters and n-ethyl toluenesulfonamide. Preferred is diisodecyl phthalate.

Polymeric plasticizing agents can be used in conjunction with the monomeric plasticizers in order to achieve special characteristics such as permanence, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic, and stearic acids, including mixtures or blends of these compounds. The polymeric plasticizers have low diffusion rates because of their higher molecular weights and also act to retard the migration of other components from the applied compositions. Additionally, low molecular weight chlorinated paraffinic oils and epoxidized soybean oil can be used as a co-plasticizers. Again, blends of several different plasticizers may be used, but will be referred to simply as the plasticizer.

A third essential component of the compositions is a thermoplastic polymeric resin which is capable of softening at application temperatures sufficiently to be flowable. Resins of this nature are commonly referred to as hot applied resins. The resins are characterized by their ability to set to a solid material by cooling rather than by solvent evaporation or chemical reaction. Thus, the resins are reduced to a soft or molten state by increasing temeprature. Most of these resins progressively soften over a wide temperature range, though some may actually have very narrow melting ranges and becomes a true liquid. Each type of resin is useful herein and is referred to as a hot applied resin. Typical resins are solid or semi-solid pastes at room temperature with softening temperatures of about 200° F. to about 375° F. Examples of thermoplastic polymeric resins include the polyethylenes, polyamides, polyvinyl butyrals, polyvinyl acetates, cellulose derivatives, polyesters, polymethyl methacrylates and ethacrylates, polyvinyl ethers and polyurethanes. Specific examples of such thermoplastic resins include ethylene ethyl acrylate copolymers, vinyl acetate styrene butadiene block copolymers and butyl rubber.

Preferred thermoplastic resins are those polymers that show solubility and compatibility with polyvinyl chloride polymers such as ethylene vinyl acetate, vinyl acetate ethylene, vinyl acetate, acrylonitrile, acrylonitrile butadiene copolymer, chlorinated ethylene vinyl acetate, polyepsilon caprolactone, methyl metacrylate and polybutylene terephthalate. An ethylene vinyl acetate having a 20-80% vinyl acetate content is preferred. Vinyl acetate ethylene copolymers having a vinyl acetate content of preferably 50-70% and most preferably 60-65% are highly preferred because of their balance of compatibility, flow, adhesion and flexibility.

The adhesion promotion system found in the current compositions preferably contains an unsaturated organosilane; an acrylic monomer; and an unsaturated acid or anhydride monomer. Most preferably it also contains an epoxy resin or modified epoxy resin and a hardening agent for the epoxy resin, such as a polyamide or modified polyamide. All of the unsaturated materials are capable of polymerization with peroxide initiation and heat. The formation of a highly functionalized oligomeric or polymeric modified acrylic species in situ (after heating) in concert with the reacted epoxy resin presumably is what is responsible for the tenacious bonding of the current adhesive to oily metals.

Examples of unsaturated organosilanes are the vinyl, acrylic and methacrylic types such as vinyl trichlorosilane, vinyl triethoxy silane, vinyl trimethoxy silane, vinyl-tris β-methoxy-ethoxy silane, 3-methacryloxypropyl trimethoxy silane, 3-methacryloxy propyl-tris-2 (methoxy-ethoxy) silane and vinyl triacetoxy silane. Examples of acrylic monomers are any of the free radical induced polymerizable mono or multifunctional acrylic or methacrylic monomers such as trimethylopropane trimethacrylate, hexane diol diacrylate, and butyl methacrylate. Examples of unsaturated acid or anhydride monomers are the vinyl, acrylic, and methacrylic mono or poly functional acid or anhydride materials such as maleic, acrylic, crotonic, methacrylic, oleic, linoleic, and tetrahydrophthalic acid or anhydride.

Examples of unmodified epoxy resins are those based on bisphenol-A and epichlorohydrin with typical properties that includes an epoxy value of 152-155 equiv./100 g and a weight per epoxide of 182-192. Other typical epoxy resins are phenol novolac, triphenylolmethane, and tetrabromo bis-A. An example of a modified epoxy resin includes the preferred elastomeric modified liquid epoxy resin which is a 40% adduct of carboxylated acrylonitrile butadiene elastomer and a liquid bisphenol-A and epichlorohydrin type epoxy. That adduct has a weight per epoxide of 325-375. Curing for the epoxy or modified epoxy resin is accomplished by reacting the resin with an appropriate curing or hardening agent. Typical hardening agents a polyamides, diethylenetriamine, methane diamine, m-phenylene diamine, diaminodiphenyl sulfone, tris (dimethyl amino methyl) phenol, dicyandiamide, BF3-monoethyl amine and nadicmethyl anhydride. Preferred is a modified polyamide hardening agent such as a latent polyamide dispersion which is an adduct of phthalic anhydride and diethylenetriamine in an unmodified liquid epoxy resin. The epoxy or modified epoxy resin/hardening agent system apparently modifies the galvanized surface by reacting with and/or to the adhesion promotion system in the preferred embodiment.

It has been found that inclusion of the adhesion promotion system in the compositions at the stated level significantly increases the adhesion of the composition to a metal surface without adversely affecting the qualities of the applied composition. That is, the composition's resistance to primer wash, paintability, viscosity stability etc. are not adversely affected by the adhesion promoter. Other adhesion promoters are also preferably used with the current materials and, again, reference to the adhesion promoter is reference to the adhesion promoter system unless otherwise indicated.

The compositions of the invention are fomulated with the above essential components to achieve a product having the desired set of characteristics considering their intended use. The composition is intended as an adhesive and sealant for use in the assembly of metal automotive parts. As such the compositions are able to flow at application temperature with the proper wet-out onto a surface, i.e., they are "pumpable". Upon cooling an initial degree of adhesion is attained as discussed below. Additionally, because of the intended use, the set composition is capable of receiving a primer wash without experiencing wash-out. Finally, the composition is able to accept a primer and top coat paint and also to withstand multiple oven bakes. The composition also has a final degree of adhesion which is very durable.

Optional components of the composition of the invention comprise waxes, heat stabilizers, fillers, pigments, and wetting agents. Such components are readily available. Amorphous waxes, carnauba wax, castor oil wax and various synthetic waxes was useful. Examples of heat stabilizers include lead and barium-cadmium-zinc systems. Fillers include ground and precipitated calcium carbonate, ground silica, clays and talcs. Examples of wetting agents are polyethylene glycol derivatives.

Compositions of the invention with the immediately aforedescribed qualities comprise (a) from about 20% to about 35% of the finely divided polyvinyl chloride resin, (b) from about 15% to about 35% of the plasticizer, (c) from about 2% to about 25% of the thermoplastic polymeric resin, and (d) from about 3% to about 15% of the adhesion promotion system. A preferred composition consists essentially (a) from about 23% to about 32% of the polyvinyl chloride resin, (b) from about 19% to about 30% of the plasticizer, (c) from about 5% to about 20% of the thermoplastic polymeric resin, (d) from about 5% to about 13% of adhesion promoter, and (e) the balance selected from the group consisting of a wax, heat stabilizer, filler, pigment, wetting agent, and mixtures thereof.

A particularly preferred composition in terms of performance and cost considerations consists essentially of (a) from about 25% to about 30% of the polyvinyl chloride resin, (b) from about 22% to about 30% of a plasticizer, (c) from about 10% to about 15% of the thermoplastic polymeric resin, (d) from about 5% to about 11% of adhesion promoter, (e) from about 15% to about 20% of a filler, (f) from about 0% to about 8% wax, and (g) from about 1% to about 4% of a heat stabilizer The aforedescribed compositions of the invention are unique in their ability to act as a structural adhesive and a sealant in the assembly of automotive bodies. Thus, the compositions are used in the body area of the assembly to bond various steel components such as hoods and roof panels. Additionally, the compositions are used in the body shop area where certain components which demand greater structural bonds as obtained by welding require a sealant to smooth over the weld. The compositions are heated from about 90° F. to about 160° F. and applied in any convenient manner, such as pumping, troweling, flowing, brushing or spraying. The compositions are thermally stable so that they can be heated and drawn from by a pumping operation for prolonged periods. Upon cooling the compositions harden to a state with an initial degree of adhesion which is adequate for the intended purpose. This solidification occurs depite the plastisol nature of the compositions.

The assembled automotive body components or body shell is next prepared for painting. Typically this involves phosphate cleaning, washing, immersing the body shell in a primer bath, applying an electric charge to effect electrodeposition of the primer to the body shell, and removing the primed body shell from the bath. The compositions originally applied as adhesives and sealants remain in tack. That is, they are not washed out onto adjoining surface areas of the body shell.

Subsequent to the priming step, if one is used, and prior to an oven bake, the body shell is top coated with a paint and oven baked to a totally cured state by plastisol fusion of the sealer and also the top coat paint. The fusion temperature is well above the aforementioned application temperature. The applied compositions of the invention are also able to withstand these operations without causing cosmetic-type problems such as discoloration, tackiness, cracking, etc.

It should be apparent the compositions of the invention enjoy all the qualities of previously used hot applied adhesive compositions and vinyl plastisol compositions, collectively. The synergistic nature of the composition components without adverse properties is very unexpected. An added benefit flowing from one composition having such qualities is reduced inventory in not having to stock two separate products as well as a consequent reduced administrative burden.

The following examples illustrate the invention.

EXAMPLE I

A preferred thermally stable hot applied plastisol composition has the following formulation:

| | % |
|---|---|
| Polyvinyl chloride dispersion resin (1) | 19.00 |
| Polyvinyl chloride blending resin (2) | 8.00 |
| Diisodecyl phthalate plasticizer | 28.00 |
| Epoxidized soybean oil plasticizer (3) | 2.00 |
| Vinyl acetate ethylene copolymer thermoplastic resin (4) | 13.00 |
| 3-methacryloxypropyl trimethoxy silane adhesion promoter (5) | 0.30 |
| Elastomeric modified liquid epoxy resin (6) | 2.00 |
| Calcium organic thixotropic agent (7) | 0.50 |
| Methacrylate ester adhesion promoter (8) | 4.50 |
| Calcium carbonate filler (9) | 8.04 |
| Hydrophobic fumed silica filler (10) | 8.00 |

-continued

| | % |
|---|---|
| Calcium oxide filler | 2.00 |
| Anionic surfactant wetting agent (11) | 0.16 |
| Modified polyamide hardening agent (12) | 3.0 |
| Cumene hydroperoxide | 0.08 |
| Tri-basic lead sulfate heat stabilizer (13) | 1.00 |
| Hydroquinone monomethyl ether | 0.02 |
| Tetrahydrophthalic anhydride adhesion promoter | 0.30 |
| Carbon black pigment | 0.05 |
| Titanium dioxide pigment | 0.05 |
| | 100.00% |

(1) A homopolymer available from Huls Corp. as Vestolit E 7031
(2) A copolymer of vinyl chloride and dibutyl maleate available from The Goodyear Tire and Rubber Co. as Pliovic MC-85
(3) Available from the C. P. Hall Co. as PlastHall ESO
(4) A hot applied resin available from USI Chemicals Co. as Vynathene EY80031
(5) Available from Dow Corning as Z-6030 Silane
(6) Available from Wilmington Chemical Corp. as Heloxy 8005.
(7) Available from Ashland Chemical Co. as Ircogel 903
(8) Available from Sartomer Co. as Chemlink 9010
(9) Available from H. M. Royal Inc. as Roy Cal L
(10) Available from Cabot Corp. as Cab-O-Sil TS-720
(11) Available from BYK Chemie USA as Byk-W 960
(12) Available from Ciba-Geigy Corp. as Hardener HY 940
(13) Available from Eagle Picher Co. as EPIstatic The above composition was subjected to various tests to demonstrate its suitability for the intended use. Initially the thermal stability of the composition at application temperature is determined. Samples of the current composition were held in an oven at 120° F. and 140° F. respectively and the viscosity of each tested over a period of time. Viscosities of the samples, as expressed in centipoises adjusted to 81.5° F. was as follows:

| Hrs | 120° F. | 140° F. |
|---|---|---|
| Initial | 2,963,800 | 2,963,800 |
| 1 | 2,740,500 | 6,252,400 |
| 7 | 2,801,400 | — |

The above results show that the composition's viscosity remains substantially constant at 120° F. for at least seven hours. At 140° F., however, the viscosity of the composition increases significantly over time. Thus, the composition is viscosity stable up to at least 120° F.

Another set of tests was used to show that the composition of this example has a sufficiently low viscosity at a pre-gel temperature to be pumpable. The viscosities of a sample of the composition is measured at various temperatures and plotted. Readings from the plot are as set forth below:

| Temperature (°F.) | Viscosity (centipoises) |
|---|---|
| 75 | 1,640,240 |
| 80 | 1,250,480 |
| 85 | 990,640 |
| 90 | 787,640 |
| 100 | 519,680 |
| 110 | 373,520 |
| 120 | 292,320 |

The above results show the viscosity of the composition decreases with temperature and is low enough to be readily pumped at an application temperature of about 120° F. The application temperature is lower than the temperature at which gelation begins.

EXAMPLE II

The formulation disclosed in Example I was tested for adhesive strength on three galvanized steel substrates under various exposure conditions. The numbers reported are the force to detach 1"×4" metal coupons with a 1 in.² bonded area pulled at 2"/minute. The specimens were heat cured for 20 minutes at 325° F. and had a bond thickness of 0.030". An average failing force from three replicates is reported. % CF refers to the % of cohesive failure for a given condition.

| Shear Overlaps | Adhesive Testing Results | | |
|---|---|---|---|
| | HOT DIP | GALVANEAL | ELECTRO GALVANEAL |
| Initial | 389 100% CF | 448 100% CF | 463 100% CF |
| 3 wks humidity | 451 80% CF | 477 67% CF | 412 72% CF |
| 3 wks 158° F. | 654 100% CF | 756 100% CF | 659 93% CF |
| 250 hrs. salt spray | 441 53% CF | 550 57% CF | 369 47% CF |
| Corrosion* | 548 78% CF | — | — |

*Exposed to 30 cycles each of: 5 hours at 158° F. 15 minutes 5% sodium chloride solution; 19.25 hours 100° F./100% humidity.

EXAMPLE III

This example demonstrates the need for an adhesion promotion system in the composition. A set of partial compositions (i.e. containing polyvinyl chloride resin containing but without a thermoplastic polymeric resin) were made and then tested for short term and long term adhesion. The compositions are:

| | Parts by Weight | | | | | |
|---|---|---|---|---|---|---|
| Homopolymer dispersion resin | 20.0 | 20.0 | 20.0 | 20.0 | 20.0 | 20.0 |
| Copolymer blending resin | 8.4 | 8.4 | 8.4 | 8.4 | 8.4 | 8.4 |
| Calcium carbonate filler | 39.8 | 39.8 | 39.8 | 39.8 | 39.8 | 39.8 |
| DIDP plasticizer | 20.0 | 20.3 | 24.7 | 20.3 | 23.2 | 20.1 |
| t-butyl perbenzoate | 0.08 | 0.08 | 0.08 | 0.08 | 0.08 | 0.08 |
| tribasic lead | 1.1 | 1.1 | 1.1 | 1.1 | 1.1 | 1.1 |
| trimethylolpropane trimethacrylate | 4.7 | — | 4.7 | 4.7 | 4.7 | 4.7 |
| methacrylate silane | 0.3 | 0.3 | — | 0.3 | 0.3 | 0.3 |
| tetrahydrophtahlic anhydride | 0.3 | 0.3 | 0.3 | — | 0.3 | 0.3 |
| elastomeric modified epoxy resin | 2.1 | 2.1 | 2.1 | 2.1 | 2.1 | — |
| modified polyamide | 3.2 | 3.2 | 3.2 | 3.2 | — | 3.2 |
| Adhesion Initial | 10 | 8.5 | 1 | 9.5 | 3.5 | 10 |
| Adhesion 2 weeks at room temperature | 10 | 4.0 | 1 | 10 | 1 | 4 |
| Adhesion 4 weeks at room temperature | 10 | 9.0 | 2 | 10 | 1 | 10 |

Adhesion results were obtained as qualitative pulling of ½"×½" bends of adhesive baked on a hot dipped galvanized panel for 6 minutes at 350° F. A rating of 10 was judged as best with 100% cohesive failure and a rating of 0 was judged as worst with total adhesive failure coupled with little or no failing force. Separate adhesions were pulled for samples made fresh and then aged at room temperature for two and four weeks respectively.

EXAMPLE IV

The composition in Example I can be modified to improve the paintability of the formulation. The composition of a paintable material is as follows:

| | % |
|---|---|
| Polyvinyl chloride dispersion resin | 19.00 |
| Polyvinyl chloride blending resin | 8.00 |
| Diisodecyl phthalate plasticizer | 8.00 |
| Vinyl acetate ethylene copolymer thermoplastic resin | 13.00 |
| 3-methacryloxypropyl trimethoxy silane adhesion promoter | 0.30 |
| Elastomeric modified liquid epoxy resin | 2.00 |
| Methacrylate ester adhesion promoter | 4.50 |
| Precipiated calcium carbonate filler (14) | 16.80 |
| Polyamino amide (15) | 3.00 |
| Calcium oxide filler | 2.00 |
| Cumene hydroperoxide | 0.08 |
| Tri-basic lead sulfate heat stabilizer | 1.00 |
| Hydroquinone monomethyl ether | 0.02 |
| Cis - 1, 2, 3, 6 - tetrahydrophthalic anhydride | 0.30 |
| Polypropylene glycol dibenzoate plasticizer (16) | 10.00 |
| Trioctyl trimellitate plasticizer | 10.00 |
| Polyadipic acid ester plasticizer (17) | 2.00 |

(14) Available from H. M. Royal as Hankuenka CC
(15) Available from Sherex Chemical Company as Euretek 580
(16) Available from Velsicol Chemical Corporation as Benzoflex 400
(17) Available from C. P. Hall as Plasthall P-670

Modifications and variations of an obvious nature are possible without departing from the scope of the invention as defined in the appended claims.

What is claimed is:

1. An adhesion promotion system for use with polyvinyl chloride plastisol compositions and other adhesive compositions in order to increase the adhesion of said compositions to a metal surface comprising:
   (a) 2.7 to 5.0% by weight of an unsaturated organosilane,
   (b) 54.0 to 40.0% by weight of an acrylic monomer,
   (c) 2.7 to 10.0% by weight of an unsaturated acid or anhydride monomer, and
   (d) 13.5 to 20.0% by weight of an epoxy resin or modified epoxy resin and 27.0 to 25.0% by weight of a hardening agent for the epoxy resin or modified epoxy resin.

2. The system of claim 1 wherein said hardening agent is selected from the group consisting of polyamides, diethylenetriamine, methane diamine, m-phenylene diamine, diaminodiphenyl sulfone, tris (dimethyl amino methyl) phenol, dicyandiamide, BF3-monoethyl amine and nadicmethyl anhydride.

3. The system of claim 1 wherein said unsaturated organosilane is selected from the group consisting of vinyl trichlorosilane, vinyl triethoxy silane, vinyl trimethoxy silane, vinyl-tris-B-methoxy-ethoxy silane, 3 methacryloxypropyl trimethoxy silane, 3-methacryloxy propyl-tris-2 (methoxy-ethoxy) silane and vinyl triacetoxy silane.

4. The system of claim 3 wherein said acrylic monomer is selected from the group consisting of trimethylolpropane trimethacrylate, hexane diol diacrylate, and butyl methacrylate.

5. The system of claim 4 wherein said unsaturated acid or anhydride monomer is selected from the group consisting of maleic, acrylic, crotonic, methacrylic, oleic, linoleic, and tetrahydrophthalic acid or anhydride.

6. The system of claim 5 wherein said unsaturated organosilane is a methacrylate silane, said acrylic monomer is trimethylolpropane trimethacrylate and said unsaturated anhydride monomer is tetrahydrophthalic anhydride.

7. The system of claim 6 wherein said epoxy resin or modified epoxy resin is an elastomenic modified epoxy resin and said hardener is a modified polyamide.

8. An adhesion promotion system for use with polyvinyl chloride plastisol compositions and other adhesive compositions in order to increase the adhesion of said compositions to a metal surface comprising:
   a) 2.7 to 5.0% by weight of said adhesion promotion system of an unsaturated organosilane selected from the group consisting of vinyl trichlorosilane, vinyl triethoxy silane, vinyl trimethoxy silane, vinyl-tris-B-methoxy-ethoxy silane, 3-methacryloxypropyl trimethoxy silane, 3-methacryloxy propyl-tris-2-(methoxy-ethoxy) silane, and vinyl triacetoxy silane;
   b) 54.0–40.0% of an acrylic monomer selected from the group consisting of trimethylolpropane trimethacrylate, hexane diol diacrylate, and butyl methacrylate; and
   c) 2.7–10.0% of an unsaturated acid or anhydride monomer.

9. The system of claim 8 wherein said unsaturated acid or anyhydride monomer is selected from the group consisting of maleic, acrylic, crotonic, methacrylic, oleic, linoleic, and tetrahydrophthalic acid or anhydride.

10. The system of claim 9 wherein said unsaturated organosilane is a methacrylate silane, said acrylic monomer is trimethylolpropane trimethacrylate and said unsaturated anhydride monomer is tetrahydrophthalic anhydride.

11. An adhesion promotion system for use with a polyvinyl chloride plastisol compositions and other adhesive compositions in order to increase the adhesion of said compositions to a metal surface comprising:
   a) 2.7 to 5.0 by weight of said adhesion promotion system of an unsaturated organosilane;
   b) 54.0 to 40.0% of an acrylic monomer; and
   c) 13.5 to 20.0% of an epoxy resin or modified epoxy resin and 27.0% to 25.0% of a hardening agent for the epoxy resin or modified epoxy resin.

12. The system of claim 11 wherein said hardening agent is selected from the group consisting of polyamide, diethlenetriamine, methane diamine, m-phenylene diamine, diaminodiphenyl sulfone, tris (dimethyl amino methyl) phenol, dicyandiamide, BF3-monoethly amine and nadicmethyl anhydride.

13. The system of claim 12 wherein said unsaturated organosilane is selcted from the group consisting of vinyl trichlorosilane, vinyl triethoxy silane, vinyl trimethoxy silane, vinyl-tris-B-methoxy-ethoxy silane, 3 methacryloxypropyl trimethoxy silane, 3-methacryloxy propyl-tris-2 (methoxy-ethoxy) silane and vinyl triacetoxy silane.

14. The system of claim 13 wherein said acrylic monomer is selected from the group consisting of trimethylolpropane trimethacrylate, hexane diol diacrylate, and butyl methacrylate.

* * * * *